April 6, 1926.
H. J. BOE
1,579,206
SAFETY DEVICE FOR CLUTCH MECHANISMS
Filed May 9, 1921        2 Sheets-Sheet 1
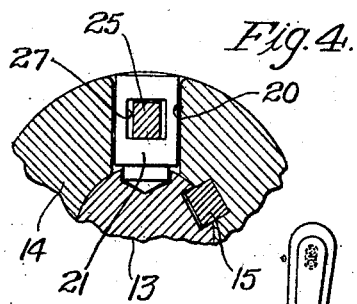
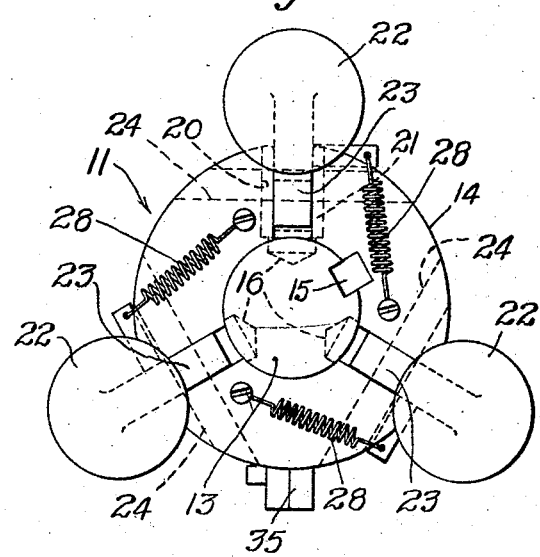
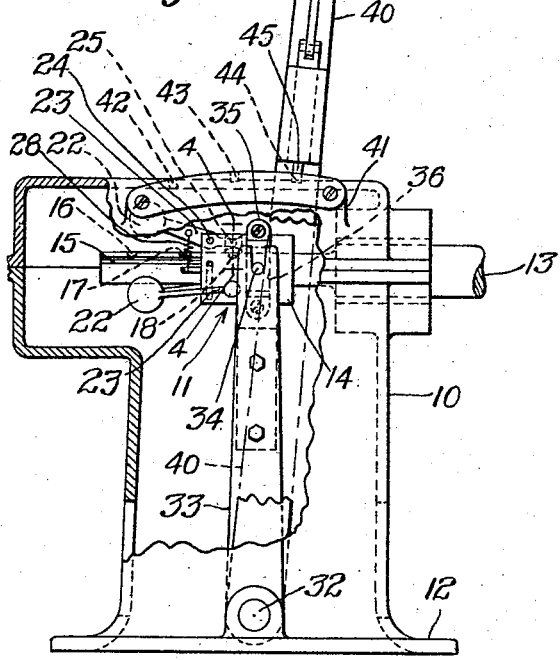
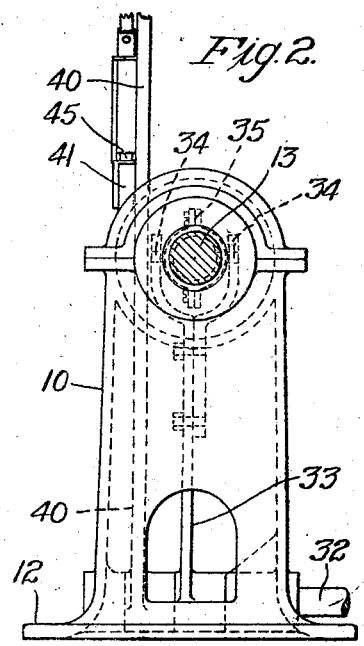
Inventor
Helmer J. Boe
by G. M. Campbell
Atty.

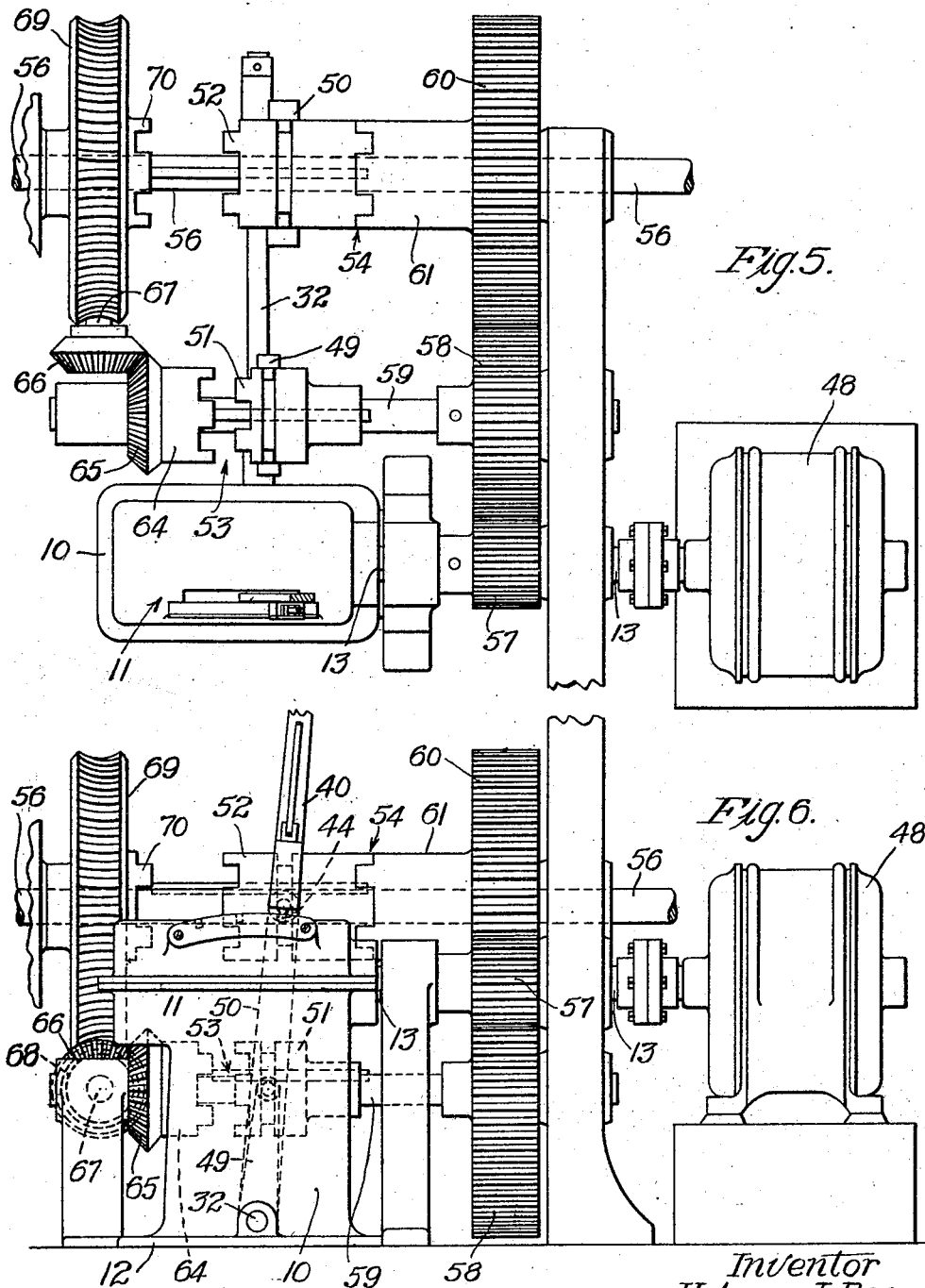

Patented Apr. 6, 1926.

1,579,206

UNITED STATES PATENT OFFICE.

HELMER JOHN BOE, OF CHICAGO, ILLINOIS, ASSIGNOR TO WESTERN ELECTRIC COMPANY, INCORPORATED, OF NEW YORK, N. Y., A CORPORATION OF NEW YORK.

SAFETY DEVICE FOR CLUTCH MECHANISMS.

Application filed May 9, 1921. Serial No. 468,043.

*To all whom it may concern:*

Be it known that I, HELMER JOHN BOE, a citizen of the United States, residing at Chicago, in the county of Cook and State of Illinois, have invented certain new and useful Improvements in Safety Devices for Clutch Mechanisms, of which the following is a full, clear, concise, and exact description.

This invention relates to safety devices for clutch mechanisms, and more particularly to a mechanism for controlling a clutch operating member.

The object of the invention in general is to provide a simple and reliable mechanism for preventing the movement of the clutch controlling member while the driving member is in motion above a certain speed, but allowing the movement of the clutch controlling member when the driving member is moving at a very low speed and when at rest, thereby guarding against the sudden application of loads to the clutch mechanism.

In accordance with the general features of this invention, there is provided a mechanism comprising a set of centrifugally operated members carried on a sleeve which is rotatable with, but slidable upon the driving shaft. The centrifugally operated members in their movement control the engagement of locking members carried on the sleeve which engage suitable surfaces on the driving shaft to lock the sleeve in its set position during the rotation of the driving shaft above a certain speed. The sleeve is adapted to be moved by the movement of the clutch controlling member which accordingly moves the locking members into alinement with the surfaces on the driving shaft. Means are provided for automatically releasing the clutch controlling member when the speed of the driving shaft has been reduced sufficiently.

In the drawings:

Fig. 1 is a front elevation of the clutch controlling mechanism embodying the features of this invention with a section of the casing broken away, showing the operating parts in their locked position;

Fig. 2 is an end view thereof looking from the right-hand side, with the clutch controlling lever partly broken away;

Fig. 3 is an enlarged end view of the driving shaft taken from the left-hand side of Fig. 1 with the mechanism carried thereby and with the omission of the casing, clutch lever, etc.;

Fig. 4 is an enlarged partial vertical cross-section taken on the line 4—4 of Fig. 1;

Fig. 5 is a plan view of one application of the invention shown mounted on a driving shaft with the shaft of a mechanism to be driven connected therewith by a two-speed clutch mechanism, and Fig. 6 is a front elevation thereof.

In the drawings as shown in Fig. 1, 10 indicates a casing, within which is housed a clutch controlling lever locking mechanism 11. The casing 10 is provided with a suitable base 12 for securing it to the floor or other supporting means. Extending into the casing through one end thereof is a main driving shaft 13 which supports the mechanism 11 and is connected to the mechanism to be operated by a two-speed clutch mechanism, to be described later on. The shaft 13 may be a direct extension of a motor shaft, as shown on the drawings, or a shaft driven by intermediate gearing. Carried upon the shaft 13 within the casing 10 is a sleeve 14 which is slidably mounted thereon and secured thereto for rotation by a feather key 15. As shown on Figs. 1, 3, and 4, the peripheral surface of the shaft 13 is provided with three sets of sockets or depressions 16, 17, and 18, each set consisting of three depressions spaced 120° apart. Mounted within depressions 20—20, positioned 120° apart and formed in the peripheral surface of the sleeve 14, are keys or pins 21—21 which are adapted to engage the three sets of depressions 16, 17, and 18 when in proper alinement therewith. The pins 21—21 are caused to engage in one or the other of the three sets of depressions 16, 17, and 18 when the shaft 13 is revolving at a suitable speed through the movement of fly balls 22—22 positioned upon one end of levers 23—23 which are pivoted within suitable sockets formed in the sleeve 14 and in longitudinal alinement with the three sets of depressions 16, 17, and 18 by the pins 24—24 with their opposite ends 25—25 entering sockets 27—27 formed in the pins 21—21.

The levers 23—23 are each equipped with a suitably mounted tension spring 28 which functions to draw the pins 24 from the depressions formed in the shaft 13 when it has stopped rotating. In some cases it is necessary that the clutch controlling lever be freed just before the main driving shaft has stopped rotating to allow the clutch mechanism to be shifted more easily. By changing the tension springs 28 for springs with greater or less tension the moment of locking or freeing the clutch controlling lever can be varied. Supported in the casing 10 near the base 12 thereof is one end of a rock shaft 32 which has suitably secured thereto a yoke lever 33 which extends upward and engages pins 34 secured in a strap 35 which rides in a circular groove 36 formed in the sleeve 14. Also secured to the rock shaft 32 within the casing 10 is a clutch lever 40 which extends upward through a suitable slot formed in the top surface of the casing 10. Formed upon the top surface of the casing is a quadrant 41 provided with three suitably spaced depressions 42, 43, and 44 adapted to be engaged by a locking dog 45 carried upon the lever 40 and suitably controlled from the operating end of the clutch lever 40. Figs. 5 and 6 show one application of the invention wherein the locking mechanism 11 is shown with the shaft 13 connected direct to a motor 48 and the rock shaft 32 extending from the casing 10 and controlling the movement of yoke levers 49 and 50 which are adapted to operate the slidable members 51 and 52 of the clutches 53 and 54, whereby a shaft 56 which drives the machine may be operated at either high or low speed or be disengaged from the driving shaft 13. As shown in the drawings, with the locking dog 45 of the clutch lever 40 in engagement with the depression 44 the shaft 56 is connected to the shaft 13 so it will operate at high speed.

In this showing, power is transmitted from the shaft 13, which is connected to the shaft of the motor 48, to a pinion 57 suitably secured to the shaft 13. The pinion 57 meshes with a gear 58 suitably secured on a stub shaft 59, which gear in turn meshes with a second gear 60 carried loose on the shaft 56. Formed on one side of the gear 60 is the non-slidable part 61 of the clutch 54. The slidable part 52 of the clutch 54 is suitably keyed to the shaft 56, thereby causing this shaft to be driven at high speed. By disengaging the locking dog 45 of the clutch lever 40 from the depression 44 and moving the clutch lever over so the locking dog will engage the depression 42, the slidable part 51 of the clutch 53 will be moved into engagement with a non-slidable part 64 thereof. In this case power will be transmitted from the gear 58 through the clutch 53 to a bevel gear 65 carried loose on the stub shaft and which has formed on one side thereof the clutch part 64. The bevel gear 65 meshes with a second bevel gear 66 suitably secured to a shaft 67 which is suitably supported below the shaft 56. Secured on the shaft 67 is a worm 68, shown in dotted outline on Fig. 6, which meshes with a worm gear 69 carried loose on the shaft 56. Formed on one side of the worm gear 69 is a second non-slidable part 70 of the clutch 54 which is engaged by the slidable member 52 thereof when the clutch lever 40 is moved from its high speed position to its low speed position. In this position the shaft 56 will run at low speed. When driving at low speed the part 61 of the clutch 54 and the gear 69 will run idle on the shaft 56.

When driving at high speed the part 51 of the clutch 53 will run idle on the shaft 59 with the bevel gears 65 and 66 standing still and consequently the worm 68 and worm gear 69 will also stand still.

With the clutch lever 40 in either of its three positions indicated at 42, 43, and 44 and the motor running, the clutch lever can not be shifted, due to the centrifugal movement of the fly balls 22—22, which move the levers 23—23 about their pivot pins 24—24 and insert the pins 21—21 into one or the other of the three sets of depressions 16, 17, and 18, thereby locking the clutch lever from movement until the motor is stopped. When the shaft 13 is stopped the springs 28 act to move the levers 23—23 inward toward the axis of the shaft 13, thereby drawing the pins 21—21 from one or the other of the three sets of depressions 16, 17, and 18 to unlock the clutch lever. In this position the clutch lever may be shifted to any one of its three positions, which movement carries the sleeve 14 and the pins 21—21 mounted therein into alinement with one of the three sets of depressions 16, 17, and 18. When the shaft 13 is rotated the fly balls will move outward, due to centrifugal action, which movement moves the pins 21—21 into the depressions directly in alinement therewith on the shaft 13, thereby locking the clutch lever 40 from being shifted during the rotation of the shaft 13.

What is claimed is:

1. In a locking mechanism for clutches, the combination with a driving member and a clutch controlling member movable into a plurality of controlling positions, of means carried by and controlled by the speed of the driving member for locking the clutch controlling member against operation when set in any one of its controlling positions.

2. In a locking mechanism for clutches, the combination with a driving member and a clutch controlling member movable into a plurality of controlling positions, of centrifugally operated means carried by and actuated by the speed of rotation of the driving member for locking the clutch controlling member against operation when set in any one of its controlling positions.

3. In a locking mechanism for clutches, the combination with a driving member and a clutch controlling member movable into a plurality of controlling positions, of centrifugally operated means carried by and actuated by the driving member for locking the clutch controlling member against operation when set in any one of its controlling positions while the driving member is rotating above a certain speed, and means for unlocking said clutch controlling member when the speed of rotation of the driving member is reduced below a certain point.

4. In a locking mechanism for clutches, a driving member provided with engaging surfaces, a sleeve slidably mounted thereon and rotatable therewith, a clutch controlling member operatively connected to said sleeve, and centrifugally operated means carried by said sleeve and controlled by the speed of rotation of said driving member to engage the engaging surfaces on said driving member whereby said clutch controlling member is locked in its set position.

5. In a locking mechanism for clutches, a driving shaft provided with a plurality of sets of sockets, a sleeve slidably mounted thereon and rotatable therewith, a plurality of pins in said sleeve adapted to engage in one of the sets of sockets in said shaft, a clutch controlling member operatively connected to said sleeve, and centrifugally operated means mounted on said sleeve and controlled by the speed of rotation of said shaft to move the pins into one of the sets of sockets whereby said clutch controlling member is locked in its set position.

6. In a locking mechanism for clutches, a driving shaft provided with a plurality of sockets, a sleeve slidably mounted thereon and rotatable therewith, a plurality of pins carried by said sleeve adapted to engage in one of the sets of sockets in said shaft, a clutch controlling member operatively connected to said sleeve, centrifugally operated means mounted on said sleeve and controlled by the speed of rotation of said shaft to move the pins into one of the sets of sockets whereby said clutch controlling member is locked in its set position while the driving shaft is rotating above a certain speed, and means for unlocking said clutch controlling member when the speed of rotation of the driving shaft is reduced below a certain point.

7. In a locking mechanism for clutches, a driving member, a driven member, a sleeve carried by one of said members, a clutch for operatively interconnecting the members, clutch controlling means operatively connected to the sleeve, and means carried by the sleeve and controlled by the speed of rotation of the associated member to engage the associated member and lock the clutch controlling member against movement.

In witness whereof, I hereunto subscribe my name this 26th day of April A. D., 1921.

HELMER JOHN BOE.